United States Patent
Li et al.

(10) Patent No.: US 9,122,118 B2
(45) Date of Patent: Sep. 1, 2015

(54) ACTIVE BARRIER AND METHOD FOR PRODUCING THE SAME, DISPLAY APPARATUS AND ACTIVE SHUTTER GLASSES

(71) Applicant: Boe Technology Group Co., Ltd., Beijing (CN)

(72) Inventors: Wenbo Li, Beijing (CN); Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/102,129

(22) Filed: Dec. 10, 2013

(65) Prior Publication Data

US 2014/0168744 A1  Jun. 19, 2014

(30) Foreign Application Priority Data

Dec. 14, 2012  (CN) .......................... 2012 1 0546651

(51) Int. Cl.
*G02F 1/15* (2006.01)
*G02F 1/155* (2006.01)
*G02B 27/22* (2006.01)
*G02F 1/29* (2006.01)

(52) U.S. Cl.
CPC ............ *G02F 1/155* (2013.01); *G02B 27/2264* (2013.01); *G02F 1/29* (2013.01); *Y10T 29/49124* (2015.01)

(58) Field of Classification Search
CPC ......... G02F 1/167; G02F 1/1508; G02F 1/15; G02F 1/1506; G02F 1/1521; G02F 1/1525; G02F 1/155
USPC .................................................. 359/290–297
See application file for complete search history.

(56) References Cited

U.S. PATENT DOCUMENTS

| | | | |
|---|---|---|---|
| 7,751,115 B2 * | 7/2010 | Song | 359/296 |
| 2010/0271685 A1 | 10/2010 | Liu | |
| 2012/0081776 A1 | 4/2012 | Yeh et al. | |
| 2012/0170115 A1 * | 7/2012 | Zhang et al. | 359/465 |

FOREIGN PATENT DOCUMENTS

| | | |
|---|---|---|
| CN | 102621759 A | 8/2012 |
| CN | 202948233 U | 5/2013 |
| TW | 201215980 A | 4/2012 |

OTHER PUBLICATIONS

English translation of Office Action received in corresponding Chinese Application No. 201210546651.1 dated Dec. 10, 2014.

* cited by examiner

*Primary Examiner* — Mahidere Sahle
(74) *Attorney, Agent, or Firm* — Kinney & Lange, P.A.

(57) ABSTRACT

An active barrier, a method for producing the active barrier, a display apparatus and an active shutter glasses are provided. The active barrier comprises: a first substrate and a second substrate; at least one set of strip electrodes disposed between the first and second substrates, each set of strip electrodes comprising two strip electrodes, two adjacent sets of strip electrodes being separated from each other; and an electrochromism layer and an electrolyte layer disposed in a region defined by the two strip electrodes of each set of strip electrodes between the first and second substrates. For each set of strip electrodes, the electrochromism layer contacts one of the two strip electrodes, and the electrolyte layer contacts at least one of the two strip electrodes. The light transmission region and the light shielding region of the active barrier can be formed by means of the oxidation reaction and the reduction reaction of the electrochromism layer, achieving the bare eye mode of 3D display and the switching mode between 2D display and 3D display. The producing process of the active barrier is simplified and the display brightness of the display apparatus is improved.

14 Claims, 6 Drawing Sheets

ACTIVE BARRIER AND METHOD FOR PRODUCING THE SAME, DISPLAY APPARATUS AND ACTIVE SHUTTER GLASSES

CROSS-REFERENCE TO RELATED APPLICATION

This application claims the benefit of Chinese Patent Application No. 201210546651.1 filed on Dec. 14, 2012 in the State Intellectual Property Office of China, the whole disclosure of which is incorporated herein by reference.

BACKGROUND OF THE INVENTION

1. Field of the Invention

The present invention relates to a technical field of stereoscopic display, more particularly, relates to an active barrier, a method for producing the active barrier, a display apparatus and an active shutter glasses.

2. Description of the Related Art

An ordinary display apparatus generally displays a scene in a two-dimension (2D) display mode and cannot represent information about a depth of field of the scene. With the development of the computer technology and the display technology, three-dimension (3D) display technology becomes a research focus of the display field.

Hereafter, it will describe the basic principle of the 3D display technology. When a viewer receives pictures from the same scene with left and right eyes, the pupil distance between the left and right eyes causes a position difference, therefore, the pictures formed on the retinas of the left and right eyes of the viewer have a slight difference, and this slight difference is referred as binocular parallax. The two slightly different pictures constitute a stereo picture pair, and the stereo picture pair produces a stereo effect after being processed by the brain visual cortex.

Figure 1:
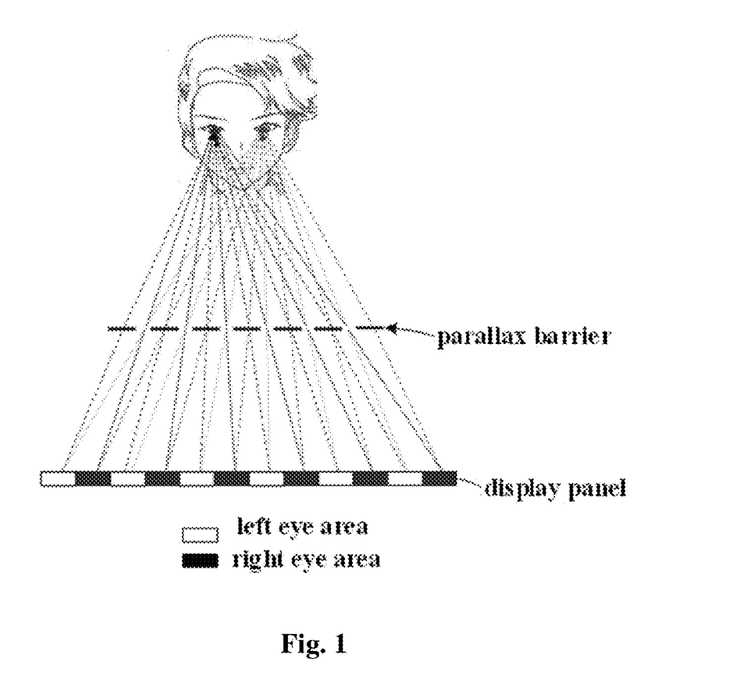
FIG. 1 is an illustrative principle view of a bare eye mode of 3D display technology.

Currently, the 3D display technology comprises a bare eye mode and a glasses mode. FIG. 1 shows a principle of the bare eye mode of 3D display technology. As shown in FIG. 1, a parallax barrier is provided between the display panel and the viewer. Since the parallax barrier comprises light transmission regions and light non-transmission regions alternatively arranged, the left eye of the viewer only can see a left eye picture, and the right eye of the viewer only can see a right eye picture. In this way, the viewer can feel the stereo effect with the bare eyes without stereo glasses.

Figure 2:
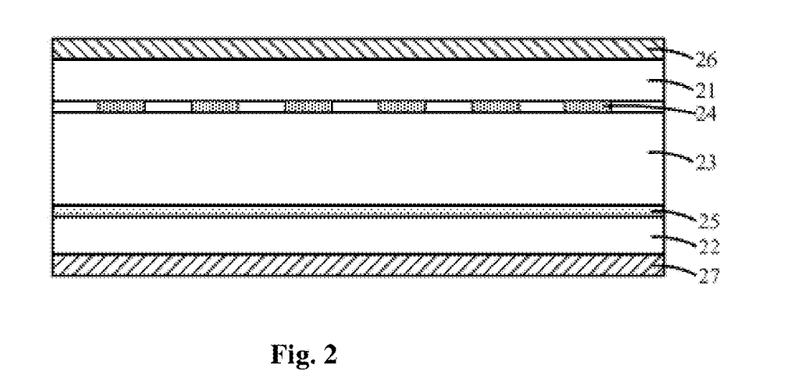
FIG. 2 is an illustrative structure view of a liquid crystal barrier in prior arts.

Currently, the parallax barrier commonly comprises a BM (black matrix) barrier and a liquid crystal barrier. The BM barrier can achieve the 3D display, but cannot switch the display between 2D and 3D. The liquid crystal barrier is an active barrier and can switch the display between 2D and 3D. FIG. 2 shows a structure of the liquid crystal barrier. As shown in FIG. 2, the liquid crystal barrier mainly comprises a first substrate 21, a second substrate 22, and a liquid crystal layer 23 disposed between the first and second substrates 21, 22. A plurality of strip ITO electrodes 24 are arranged and equally spaced from each other on an inner side of the first substrate 21 (toward the liquid crystal 23), and a first polarizer 26 is provided on an outer side of the first substrate 21. A plate ITO electrode 25 is provided on an inner side of the second substrate 22, and a second polarizer 27 is provided on an outer side of the second substrate 22. The polarization direction of the first polarizer 26 is perpendicular to that of the second polarizer 27. In order to ensure liquid crystal molecules of the liquid crystal layer are evenly arranged in a fixed orientation, two polyimide (PI) films are often coated on regions of the inner sides of the first and second substrates which are in contact with the liquid crystal molecules, the friction orientations of the two polyimide films form 90 degrees relative to each other, so that the liquid crystal molecules have a twist angle of 90 degrees without a voltage applied thereon.

Hereafter, it will describe the operation principle of the liquid crystal barrier. When a voltage is not applied on the liquid crystal barrier, the liquid crystal molecules have the twist angle of 90 degrees, therefore, a light is affected by the second polarizer, and a polarization light of the light which is parallel to the polarization direction of the second polarizer enters the liquid crystal layer, passes through the liquid crystal molecules, and reaches the first polarizer. When the light reaches the first polarizer, the polarization direction of the light is parallel to the polarization direction of the first polarizer, and the light can transmit through the first polarizer. Thereby, when there is no voltage applied on the liquid crystal barrier, the light can transmit through the liquid crystal barrier, and in this case, the liquid crystal barrier is operated in the 2D display mode.

When a voltage is applied on the liquid crystal barrier, the liquid crystal molecules corresponding to the strip electrodes are deflected and the orientation thereof generally is parallel to a direction of an electric field. The liquid crystal molecules corresponding to a region beyond the strip electrodes are not deflected. In this case, the light enters from the second polarizer, and the polarization light of the light which is parallel to the polarization direction of the second polarizer enters the liquid crystal layer. The direction of the polarization light is changed after passing through the non-deflected liquid crystal molecules and has a polarization direction parallel to the polarization direction of the first polarizer when reaching the first polarizer and can transmit through the first polarizer.

Contrary, the direction of the polarization light is not changed after passing through the deflected liquid crystal molecules. Therefore, the polarization light has a polarization direction perpendicular to the polarization direction of the first polarizer when reaching the first polarizer and cannot transmit through the first polarizer. As a result, when there is a voltage applied on the liquid crystal barrier, the region of the liquid crystal barrier where the strip electrodes are located is formed as a light non-transmission region, the other region of the liquid crystal barrier beyond the strip electrodes is held as a light transmission region. In this way, a parallax barrier is formed. As a result, the left eye of the viewer only can see the left eye picture, the right eye of the viewer only can see the right eye picture, and the 3D display is achieved by separating the visual pictures of the left and right eyes.

Although the liquid crystal barrier can switch the display between 2D and 3D, it has poor display brightness due to the effect of the polarizer. Furthermore, in the 3D display, the voltage must be applied on the strip electrodes of the liquid crystal barrier all the time, consuming large amounts of energy.

SUMMARY OF THE INVENTION

The present invention has been made to overcome or alleviate at least one aspect of the above mentioned disadvantages.

Accordingly, it is an object of the present invention to provide an active barrier, a method for producing the same, a display apparatus and an active shutter glasses for increasing display brightness of the display apparatus and decreasing energy consumption.

According to an aspect of the present invention, there is provided an active barrier, comprising:

An active barrier, comprising:

a first substrate and a second substrate;

at least one set of strip electrodes disposed between the first and second substrates, each set of strip electrodes comprising two strip electrodes, and two adjacent sets of strip electrodes being separated from each other; and at least one electrochromism layer and at least one electrolyte layer, wherein one of the at least one of electrochromism layer and one of the at least one electrolyte layer are disposed in a region defined by the two strip electrodes of each set of strip electrodes between the first and second substrates, wherein, for each set of strip electrodes, the electrochromism layer contacts one of the two strip electrodes, and the electrolyte layer contacts at least one of the two strip electrodes.

According to another aspect of the present invention, there is provided a method for producing an active barrier, comprising steps of:

S41: forming at least one set of strip electrodes on a first substrate or a second substrate by a patterning process;

S42: forming an electrochromism layer and an electrolyte layer in a region defined by two strip electrodes of each set of strip electrodes on the first substrate or the second substrate; and S43: assembling and packing the first substrate and the second substrate.

According to another aspect of the present invention, there is provided a display apparatus, comprising:

a display panel; and an active bather, according to the above embodiment, disposed in a display region of the display panel.

According to another aspect of the present invention, there is provided an active shutter glasses, comprising:

a first substrate and a second substrate;

at least one set of strip electrodes disposed between the first and second substrates, each set of strip electrodes comprising two strip electrodes, and two adjacent sets of strip electrodes being separated from each other; and at least one electrochromism layer and at least one electrolyte layer, wherein one of the at least one of electrochromism layer and one of the at least one electrolyte layer are disposed in a region defined by the two strip electrodes of each set of strip electrodes between the first and second substrates;

wherein, for each set of strip electrodes, the electrochromism layer contacts one of the two strip electrodes, and the electrolyte layer contacts at least one of the two strip electrodes.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided an active barrier, comprising: a first substrate and a second substrate; at least one set of strip electrodes disposed between the first and second substrates, each set of strip electrodes comprising two strip electrodes, two adjacent sets of strip electrodes being separated from each other; and at least one electrochromism layer and at least one electrolyte layer, wherein one of the at least one electrochromism layer and one of the at least one electrolyte layer are disposed in a region defined by the two strip electrodes of each set of strip electrodes between the first and second substrates. For each set of strip electrodes, the electrochromism layer contacts one of the two strip electrodes, and the electrolyte layer contacts at least one of the two strip electrodes.

In an active barrier according to an exemplary embodiment of the present invention, a light transmission region and a light shielding region are formed in the active barrier by means of an oxidation reaction and reduction reaction of the electrochromism layer disposed between the two strip electrodes of each set of strip electrodes. As a result, the active barrier of the present invention can achieve a bare eye mode of 3D display and can switch a 2D picture to a 3D picture.

In various embodiments of the present invention, the electrochromism layer is made of electrochromism material. In an exemplary embodiment, the electrochromism material comprises viologen derivative. The electrochromism material is a homogeneous aqueous solution obtained by mixing a polymer base material with a chromogenic material and an accessory material. The homogeneous aqueous solution may have a viscosity as necessary and can form a solid film after drying.

Generally, when high and low external electric fields or positive and negative external electric fields are alternatively applied to the electrochromism material, charges (ions or electrons) are injected into or taking out of the electrochromism material, and the electrochromism material is reversibly converted between a low transmittance of coloration state (non-transparent state) and a high transmittance of achromatic state (transparent state), that is, the electrochromism material is reversibly converted between a color appearance and a transparent appearance.

The electrolyte layer of the present invention generally comprises a polymer electrolyte that can store or conduct ions. The polymer electrolyte is a viscous sol solution made of mixed organic solvents. The viscous sol solution can be formed as a gel polymer electrolyte similar to a lithium-ion battery after solvents thereof having low boiling point are partly evaporated.

Hereafter, exemplary embodiments of the present disclosure will be described hereinafter in detail with reference to the attached drawings. Please be noted that the exemplary embodiments described hereinafter are only a part of the embodiments of the present invention, instead of all embodiments of the present invention. According to the teaching of the exemplary embodiments of the present invention, it would be appreciated by those skilled in the art that various other embodiments without departing from the principles and spirit of the disclosure are still covered by the scope of the present invention.

In an active barrier of the present invention, the strip electrode is made of a conductive material. In an exemplary embodiment, the strip electrode may be made of a material selected from at least one of Indium-Tin Oxide (ITO), Indium Zinc Oxide (IZO), Indium Gallium Zinc Oxide (IGZO), or combination thereof. In another exemplary embodiment, the strip electrode may be made of a non-transparent metal material.

The active barrier according to exemplary embodiments of the present disclosure will be described hereinafter in detail based on a position relation between the electrochromism layer and the electrolyte layer disposed between the two strip electrodes of each set of strip electrodes.

Figure 3A:
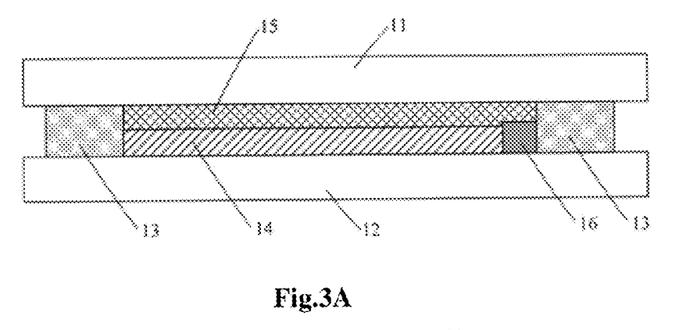
FIG. 3A is an illustrative structure view of an active barrier according to a first exemplary embodiment of the present invention.

FIG. 3A is an illustrative structure view of an active barrier according to a first exemplary embodiment of the present invention. In the active barrier according to the first exemplary embodiment, the electrolyte layer is disposed above the electrochromism layer.

As shown in FIG. 3A, in the first exemplary embodiment of the present invention, the active barrier comprising: a first substrate 11 and a second substrate 12; at least one set of strip electrodes disposed between the first and second substrates 11, 12, each set of strip electrodes comprising two strip electrodes 13, two adjacent sets of strip electrodes being separated from each other without contacting with each other; and an electrochromism layer 14, an electrolyte layer 15 and an insulation layer 16 disposed in a region defined by the two strip electrodes 13 of each set of strip electrodes between the first and second substrates 11, 12.

In an exemplary embodiment, as shown in FIG. 3A, for each set of strip electrodes, the electrochromism layer 14 and the insulation layer 16 are disposed on the first substrate 11. One side (left side in FIG. 3A) of the electrochromism layer 14 is in contact with one of the two strip electrodes 13 (the strip electrode 13 at left side) of a respective set of strip electrodes, and the other side (right side) of the electrochromism layer 14 is in contact with one side (left side) of the insulation layer 16. The other side (right side) of the insulation layer 16 is in contact with the other of the two strip electrodes 13 (the strip electrode 13 at right side). The electrolyte layer 15 is disposed above the electrochromism layer 14 and the insulation layer 16. Left and right sides of the electrolyte layer 15 are in contact with the two strip electrodes 13 of the respective set of strip electrodes, respectively.

In a further exemplary embodiment, the insulation layer 16 has a thickness larger than or equal to a thickness of the electrochromism layer 14 and less than or equal to a thickness of the strip electrode 13. In this way, it can ensure that the electrochromism layer 14 is electrically isolated from the other (the strip electrode 13 at right side in FIG. 3) of the two strip electrodes 13 by the insulation layer 16, and allow the electrolyte layer 15 to electrically connect the strip electrode 13 at right side in FIG. 3.

In order to ensure that the electrochromism layer 14 does not contact the other (the strip electrode 13 at right side in FIG. 3) of the two strip electrodes 13, the thickness of the insulation layer 16 connected to the electrochromism layer 14 may be slightly larger than that of the electrochromism layer 14.

In an improved exemplary embodiment based on the active barrier shown in FIG. 3A, one side of the electrolyte layer 15 is in contact with one of the two strip electrodes 13 of the respective set of strip electrodes. More specifically, a further insulation layer is disposed between an end of the electrolyte layer 15, which is away from the insulation layer 16 between the electrochromism layer 14 and the other (the strip electrode 13 at right side in FIG. 3A) of the two strip electrodes 13, and the one (the strip electrode 13 at left side) of the two strip electrodes 13.

Figure 3B:
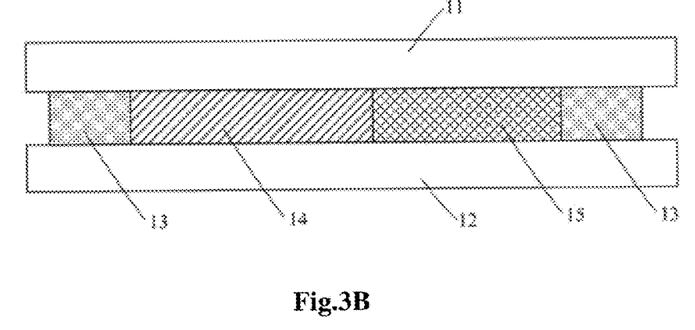
FIG. 3B is an illustrative structure view of an active barrier according to a second exemplary embodiment of the present invention.

FIG. 3B is an illustrative structure view of an active barrier according to a second exemplary embodiment of the present invention. In the second exemplary embodiment, the electrolyte layer is disposed on the same layer as the electrochromism layer.

As shown in FIG. 3B, in the second exemplary embodiment of the present invention, the active barrier comprising: a first substrate 11 and a second substrate 12; at least one set of strip electrodes disposed between the first and second substrates 11, 12, each set of strip electrodes comprising two strip electrodes 13, two adjacent sets of strip electrodes being separated from each other without contacting with each other; an electrochromism layer 14 and an electrolyte layer 15 disposed in a region defined by the two strip electrodes 13 of each set of strip electrodes between the first and second substrates 11, 12.

In an exemplary embodiment, as shown in FIG. 3B, for each set of strip electrodes, the electrochromism layer 14 and the electrolyte layer 15 are disposed on the first substrate 11. One side of the electrochromism layer 14 is in contact with one of the two strip electrodes 13 of a respective set of strip electrodes, and the other side of the electrochromism layer 14 is in contact with one side of the electrolyte layer 15. The other side of the electrolyte layer 15 is in contact with the other of the two strip electrodes 13 of the respective set of strip electrodes.

The electrochromism layer of the active barrier according to the first and second embodiments of the present invention comprises working states in the following three conditions:

(i) First Condition or Initial State

There is no voltage applied on the active barrier, and the electrochromism layer between the two strip electrodes of each set of strip electrodes is held in the initial state (transparent state), therefore, the initial state of the active barrier exhibits the transparent state;

(ii) Second Condition

There is a voltage applied on the active barrier. For each set of strip electrodes, if the voltage applied on one (the strip electrode at left side in FIGS. 3A, 3B) of the two strip electrodes, which is in contact with the electrochromism layer, is higher than that applied on the other of the two strip electrodes, the electrochromism layer between the two strip electrodes occurs a reduction reaction under an action of an electric field, at the time, the electrochromism layer exhibits a non-transparent state and forms a light shielding region of the active barrier;

(iii) Third Condition

There is a voltage applied on the active barrier. For each set of strip electrodes, if the voltage applied on one of the two strip electrodes, which is in contact with the electrochromism layer, is lower than that applied on the other of the two strip electrodes, the electrochromism layer between the two strip electrodes occurs an oxidation reaction under an action of an electric field, at the time, the electrochromism layer exhibits a transparent state and forms a light transmission region of the active barrier.

In an exemplary embodiment, in order to facilitate controlling the two strip electrodes of each set of strip electrodes, one, for example, the strip electrode at right side in FIGS. 3A, 3B, of the two strip electrodes of each set of strip electrodes which is not in contact with the electrochromism layer is set as a common electrode. Furthermore, the common electrode generally may be grounded and applied a voltage about 0V.

In an exemplary embodiment, after the voltage applied on each set of strip electrodes is kept for a period time of 0.1~0.3 second, if the voltage is removed, the electrochromism layer between the two strip electrodes of each set of strip electrodes does not change its state and keeps its current state, achieving the bistable function of the active barrier and reducing the energy consumption.

When the voltage difference cross the electrochromism layer becomes larger, the reduction speed (changing from the transparent state to the non-transparent state) and the oxidation speed (changing from the non-transparent state to the transparent state) of the electrochromism layer become quicker accordingly. However, the voltage difference between the two strip electrodes is often controlled within 5V to protect the strip electrodes from being damaged by an overlarge voltage difference.

In another exemplary embodiment of the present invention, any two adjacent sets of strip electrodes may be isolated from each other by a space or a protection layer to prevent an interference therebetween. The protection layer may be made of insulation material.

Figure 4:
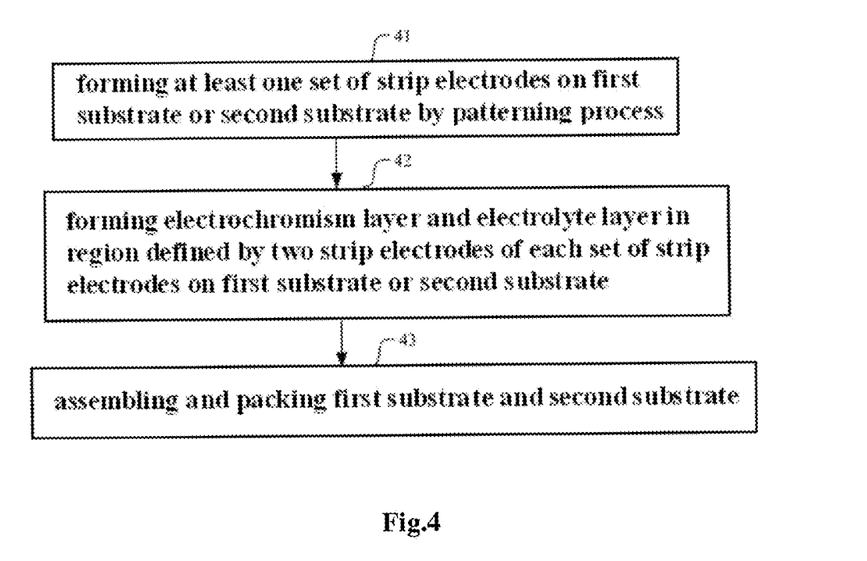
FIG. 4 is a general flow chart of a method for producing an active barrier according to an exemplary embodiment of the present invention.

As shown in FIG. 4, according to another aspect of the present invention, there is provided a method for producing an active barrier, comprising steps of:

S41: forming at least one set of strip electrodes on a first substrate or a second substrate by a patterning process;

S42: forming an electrochromism layer and an electrolyte layer in a region defined by two strip electrodes of each set of strip electrodes on the first substrate or the second substrate; and S43: assembling and packing the first substrate and the second substrate.

Figure 5A:
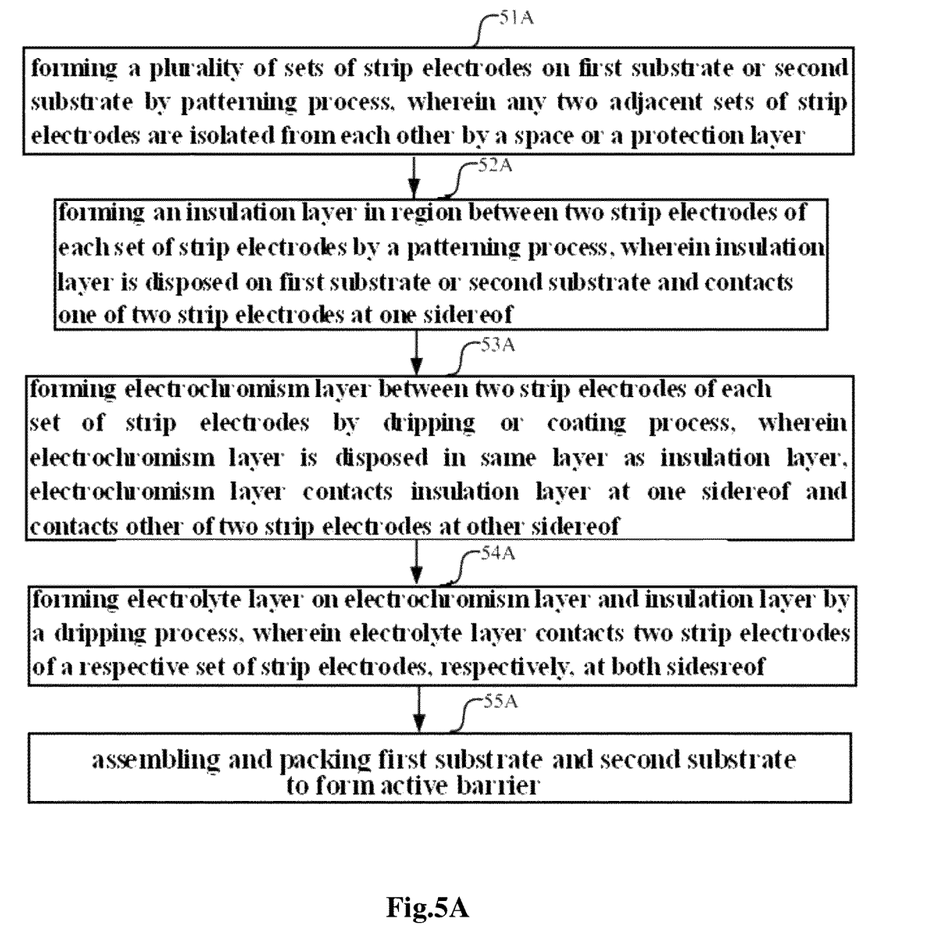
FIG. 5A is a flow chart of a first method for producing the active barrier according to the first exemplary embodiment of the present invention.

FIG. 5A is a flow chart of a first method for producing an active barrier according to the first exemplary embodiment of the present invention.

As shown in FIG. 5A, the first method for producing the active barrier comprising steps of:

S51A: forming a plurality of sets of strip electrodes on a first substrate or a second substrate by a patterning process, wherein any two adjacent sets of strip electrodes are isolated from each other by a space or a protection layer;

S52A: forming an insulation layer in region between two strip electrodes of each set of strip electrodes by a patterning process, wherein the insulation layer is disposed on the first substrate or the second substrate and is in contact with one of the two strip electrodes at one side thereof;

S53A: forming an electrochromism layer between the two strip electrodes of each set of strip electrodes by a dripping or coating process, wherein the electrochromism layer is disposed in the same layer as the insulation layer, and the electrochromism layer is in contact with the insulation layer at one side thereof and with the other of the two strip electrodes at the other side thereof;

S54A: forming an electrolyte layer on the electrochromism layer and the insulation layer by a dripping process, wherein the electrolyte layer is in contact with the two strip electrodes of a respective set of strip electrodes, respectively, at both sides thereof;

S55A: assembling and packing the first substrate and the second substrate to form the active barrier.

In the step S51A, A film made of ITO or other conductive material is coated on the first substrate or the second substrate by a sputtering process, and patterns for each set of strip electrodes are formed by a mask. If a protection layer is disposed between two adjacent sets of strip electrodes, after the step S51A, the protection layer is formed between any two adjacent sets of strip electrodes by a single patterning process so that any two adjacent sets of strip electrodes are isolated from each other by the protection layer. The protection layer may be made of insulation material. For example, a film of insulation material may be deposited on the first or second substrate by a chemical vapor deposition process, and the pattern of the protection layer may be formed on the first or second substrate by a mask.

In the step S52A, a film of insulation material is deposited on the first or second substrate by a chemical vapor deposition process, and the pattern of the insulation layer is formed on the first or second substrate by a mask. In an exemplary embodiment, the insulation layer may be disposed on the same substrate as the strip electrodes. That is, all of the insulation layer and the strip electrodes are disposed on the first or second substrate. In another exemplary embodiment, the insulation layer and the strip electrodes may be disposed on different substrates. That is, the insulation layer is disposed on one of the first and second substrates, and the strip electrodes are disposed on the other of the first and second substrates.

Figure 5B:
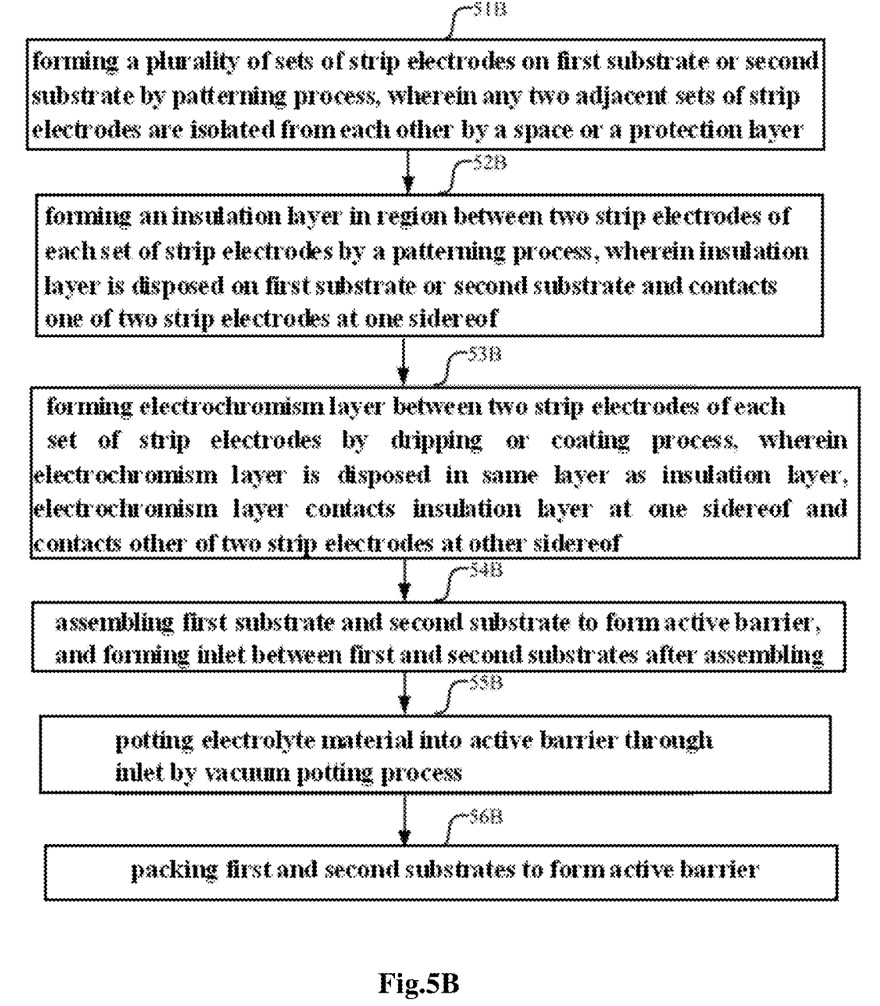
FIG. 5B is a flow chart of a second method for producing the active barrier according to the first exemplary embodiment of the present invention.

FIG. 5B is a flow chart of a second method for producing the active bather according to the first exemplary embodiment of the present invention. As shown in FIG. 5B, the second method for producing the active barrier comprising steps of:

S51B: forming a plurality of sets of strip electrodes on a first substrate or a second substrate by a patterning process, wherein any two adjacent sets of strip electrodes are isolated from each other by a space or a protection layer;

S52B: forming an insulation layer in region between two strip electrodes of each set of strip electrodes by a patterning process, wherein the insulation layer is disposed on the first substrate or the second substrate and is in contact with one of the two strip electrodes at one side thereof;

S53B: forming an electrochromism layer between the two strip electrodes of each set of strip electrodes by a dripping or coating process, wherein the electrochromism layer is disposed in the same layer as the insulation layer, and the electrochromism layer is in contact with the other side of the insulation layer at one side thereof and with the other of the two strip electrodes at the other side thereof;

S54B: assembling the first substrate and the second substrate to form the active barrier, and forming an inlet between the first and second substrates after assembling;

S55B: potting electrolyte material into a space between the first substrate and the second substrate through the inlet by a vacuum potting process;

S56B: packing the first and second substrates to form the active barrier.

Figure 6:
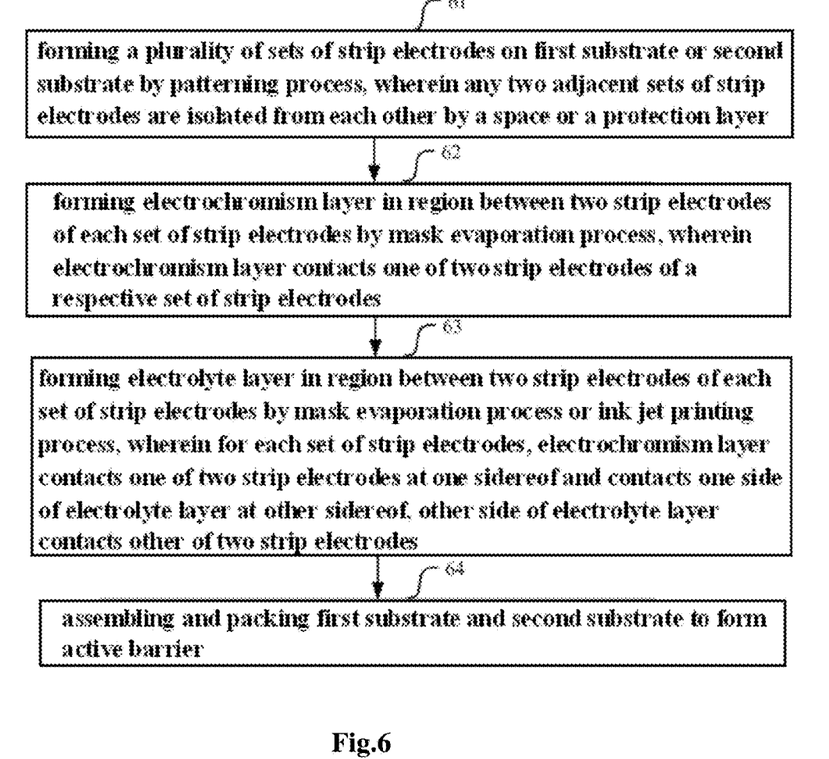
FIG. 6 is a flow chart of a method for producing the active barrier according to the second exemplary embodiment of the present invention.

FIG. 6 is a flow chart of a method for producing the active bather according to the second exemplary embodiment of the present invention. The method for producing the active bather shown in FIG. 6 comprising steps of:

S61: forming a plurality of sets of strip electrodes on a first substrate or a second substrate by a patterning process, wherein any two adjacent sets of strip electrodes are isolated from each other by a space or a protection layer;

S62: forming an electrochromism layer in a region between two strip electrodes of each set of strip electrodes by a mask evaporation process, wherein the electrochromism layer contacts one of two strip electrodes of a respective set of strip electrodes;

S63: forming an electrolyte layer in another region between two strip electrodes of each set of strip electrodes by a mask evaporation process or an ink jet printing process, wherein for each set of strip electrodes, the electrochromism layer contacts one of two strip electrodes at one side thereof and contacts one side of electrolyte layer at other side thereof, and the other side of electrolyte layer contacts the other of two strip electrodes;

S64: assembling and packing the first substrate and the second substrate to form the active barrier.

In the step S62, a mask is formed to have a predetermined pattern before the mask evaporation process. The mask is used to evaporate the electrochromism layer in the predetermined pattern.

In an exemplary embodiment, the electrochromism layer may be disposed on the same substrate as the strip electrode. That is, all of the electrochromism layer and the strip electrodes are disposed on the first or second substrate. In another exemplary embodiment, the electrochromism layer and the strip electrodes may be disposed on different substrates. That is, the electrochromism layer is disposed on one of the first and second substrates, and the strip electrodes are disposed on the other of the first and second substrates.

In the step S63, during the ink jet printing process, directionally jetting the ink is performed by accurately moving position of a nozzle of an ink jet apparatus to form the electrolyte layer. The ink jet printing process for forming the electrolyte layer does not need the mask and the vacuum evaporation apparatus, further saving the cost.

The active barrier according to exemplary embodiments of the present invention may be applied in a display apparatus to achieve the bare eye mode of 3D display and the switching between 2D display and 3D dispaly. It will describe these cases in detail hereafter.

In an exemplary embodiment of the present invention, there is provided a display apparatus, comprising: a display panel; and the active barrier according to the above embodiments, disposed in a display region of the display panel.

In another exemplary embodiment, a projection area of the electrochromism layer, located between the two strip electrodes of each set of strip electrodes of the active barrier, projected on an array substrate of the display apparatus is an area where a column of pixels are located.

In another exemplary embodiment, if a projection area of the electrochromism layer, located between the two strip electrodes of each set of strip electrodes of the active barrier, projected on an array substrate of the display apparatus is larger than an area where a column of pixels are located, then an area between the two strip electrodes of each set of strip electrodes except the electrochromism layer and that occupied by the two strip electrodes are blocked with a black matrix. The parts in the other region except the electrochromism layer may be made of non-transparent material. For example, for the active barrier shown in FIG. 3A, the strip electrodes of each set of strip electrodes and the insulation layer are all made of the non-transparent material. For the active barrier shown in FIG. 3B, the strip electrodes of each set of strip electrodes and the electrolyte layer are all made of the non-transparent material.

The display panel of the display apparatus according to exemplary embodiments of the present invention may comprise, such as, a liquid crystal panel, an organic light emitting diode (OLED), a plasma display panel (PDP), or a cathode radial tube (CRT), etc.

Hereafter, it will describe the operation principle of the display apparatus of the present invention with, for example, the active barrier of FIG. 3B. Since the operation principle of the display apparatus with the active barrier of FIG. 3A is similar, and the description thereof is omitted herein.

Figure 7:
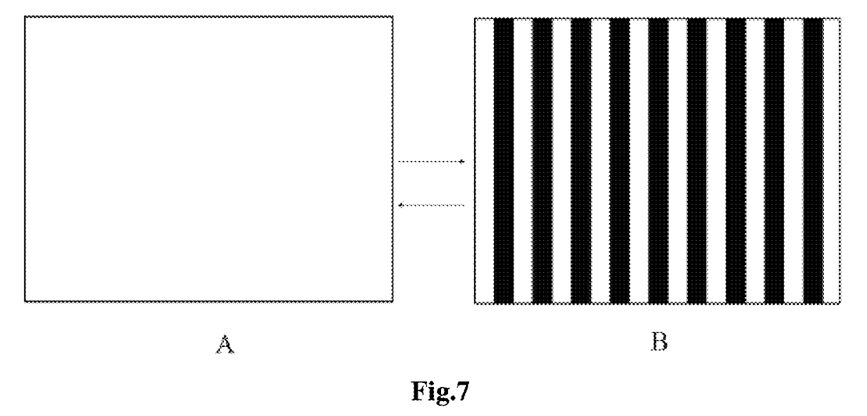
FIG. 7 is an illustrative principle view of applying an active barrier of the present invention in a display apparatus.

In the initial state, there is no voltage applied on the strip electrodes of the active barrier, and at this time, the electrochromism layer is in the transparent state, and a light emitted from a backlight source of the display apparatus can transmit through the electrochromism layer of the active barrier. In this case, as shown in FIG. 7A, the display apparatus is operated in the 2D display mode.

In an operation manner of the active barrier, if the strip electrodes of the even sets of strip electrodes which are in contact with the electrochromism layers are applied with a positive voltage, for example, about 0.1~3V, the strip electrodes of the odd sets of strip electrodes which are in contact with the electrochromism layers are not applied with a voltage, and the strip electrodes of the odd sets of strip electrodes which are not in contact with the electrochromism layers are used as the common electrode with a voltage value of 0V, then the electrochromism layers between the strip electrodes of the even sets of strip electrodes occur the reduction reaction under the electric field and become the non-transparent state to form the light shielding region of the active barrier, and the electrochromism layers between the strip electrodes of the odd sets of strip electrodes are still held in the transparent state to form the light transmission region of the active barrier. In this case, as shown in FIG. 7B, the display apparatus is operated in the 3D display mode, achieving the bare eye mode of 3D display.

In the 3D display mode, if the strip electrodes of the even sets of strip electrodes which contact the electrochromism layers are applied with a negative voltage, for example, about −0.1~−3V, the strip electrodes of the odd sets of strip electrodes which contact the electrochromism layers are not applied with a voltage, and if the strip electrodes of the odd sets of strip electrodes which do not contact the electrochromism layers are used as the common electrode with a voltage value of 0V, then the electrochromism layers between the strip electrodes of the even sets of strip electrodes occur the oxidation reaction under the electric field and become the transparent state to form the light transmission region of the active barrier, and the electrochromism layers between the strip electrodes of the odd sets of strip electrodes are still held in the transparent state to form the light transmission region of the active barrier. In this case, as shown in FIG. 7A, the display apparatus is operated in the 2D display mode, achieving the switch from the 3D display mode to the 2D display mode.

In another operation mode of the active barrier, if the strip electrodes of the even sets of strip electrodes which contact the electrochromism layers are applied with a positive voltage, for example, about 0.1~3V, the strip electrodes of the odd sets of strip electrodes which contact the electrochromism layers are applied with a negative voltage, for example, about −0.1~−3V, and the strip electrodes of the odd sets of strip electrodes which do not contact the electrochromism layers are used as the common electrode with a voltage value of 0V, then the electrochromism layers between the strip electrodes of the even sets of strip electrodes occur the reduction reaction under the electric field and become the non-transparent state to form the light shielding region of the active barrier, and the electrochromism layers between the strip electrodes of the odd sets of strip electrodes occur the oxidation reaction under the electric field and are held in the transparent state to form the light transmission region of the active barrier. In this case, as shown in FIG. 7B, the display apparatus is operated in the 3D display, achieving the bare eye mode of 3D display.

In the 3D display mode, if the strip electrodes of the even sets of strip electrodes which contact the electrochromism layers are applied with a negative voltage, for example, about −0.1~−3V, the strip electrodes of the odd sets of strip electrodes which contact the electrochromism layers are not applied with a voltage, and if the strip electrodes of the odd sets of strip electrodes which do not contact the electrochromism layers are used as the common electrode with a voltage value of 0V, then the electrochromism layers between the strip electrodes of the even sets of strip electrodes occur the oxidation reaction under the electric field and become the transparent state to form the light transmission region of the active barrier, and the electrochromism layers between the strip electrodes of the odd sets of strip electrodes still keep the transparent state to form the light transmission region of the active barrier. In this case, as shown in FIG. 7A, the display apparatus is operated in the 2D display mode, achieving the switch from the 3D display mode to the 2D display mode.

In an exemplary embodiment, after the voltage applied on each set of strip electrodes is kept for a period time of 0.1~0.3 second, if the voltage is removed, the electrochromism layer between the two strip electrodes of each set of strip electrodes does not change its state and keeps its current state, further reducing the energy consumption.

In another aspect according to an exemplary embodiment of the present invention, there is provided active shutter glasses comprising left and right glasses, and each of the left and right glasses comprising:

a first substrate and a second substrate;

at least one set of strip electrodes disposed between the first and second substrates, each set of strip electrodes comprising two strip electrodes, two adjacent sets of strip electrodes being separated from each other; and at least one electrochromism layer and at least one electrolyte layer, wherein one electrochromism layer and one electrolyte layer are disposed in a region defined by the two strip electrodes of each set of strip electrodes between the first and second substrates;

wherein, for each set of strip electrodes, the electrochromism layer contacts one of the two strip electrodes, and the electrolyte layer contacts at least one of the two strip electrodes.

In an exemplary embodiment, a protection layer is disposed between any two adjacent sets of strip electrodes, and the protection layer is made of insulation material.

In an exemplary embodiment, as shown in FIG. 3A, an insulation layer is disposed between the two strip electrodes of each set of strip electrodes of each of the glasses. For each set of strip electrodes of each of the glasses, the electrochromism layer contacts one of the two strip electrodes at one side thereof, and contacts one side of the insulation layer at the other side thereof, the other side of the insulation layer contacts the other of the two strip electrodes; the electrolyte layer is disposed above the electrochromism layer, and contacts the two strip electrodes, respectively, at both sides thereof.

In an exemplary embodiment, the insulation layer has a thickness larger than or equal to a thickness of the electrochromism layer and less than or equal to a thickness of the strip electrode.

In another exemplary embodiment, as shown in FIG. 3B, for each set of strip electrodes of each of the glasses, the electrochromism layer contacts one of the two strip electrodes at one side thereof, and contacts one side of the electrolyte layer at the other side thereof, the other side of the electrolyte layer contacts the other of the two strip electrodes.

Since the method for producing the active shutter glasses is similar to the method for producing the above active barrier, the description about the method for producing the active shutter glasses is omitted herein and can refer to the method for producing the above active barrier.

In an exemplary embodiment, the left and right glasses of the active shutter glasses both may be composed of the same kind of active barrier, for example, the left and right glasses both may comprise the active barrier of FIG. 3A or FIG. 3B. In another exemplary embodiment, the left and right glasses of the active shutter glasses both may be composed of different active barriers, for example, the left glass may comprise the active barrier of FIG. 3A, and the right glass may comprise the active barrier of FIG. 3B.

In an exemplary embodiment, for each set of strip electrodes in each of glasses, if there is no voltage applied on each of the strip electrodes of each set of strip electrodes, the electrochromism layer is operated in the transparent state and forms the light transmission region.

In another exemplary embodiment, for each set of strip electrodes in each of the first and second glasses, if a voltage applied on one of the two strip electrodes is higher than that applied on the other of the two strip electrodes, the electrochromism layer exhibits a non-transparent state under an action of an electric field and forms a light shielding region.

In another exemplary embodiment, for each set of strip electrodes in each of glasses, if a voltage applied on one of the two strip electrodes is lower than that applied on the other of the two strip electrodes, the electrochromism layer exhibits a transparent state under an action of an electric field and forms a light transmission region.

In each of the first and second glasses, the strip electrode of each set of strip electrodes which do not contact the electrochromism layer is used as the common electrode.

Figure 8A:
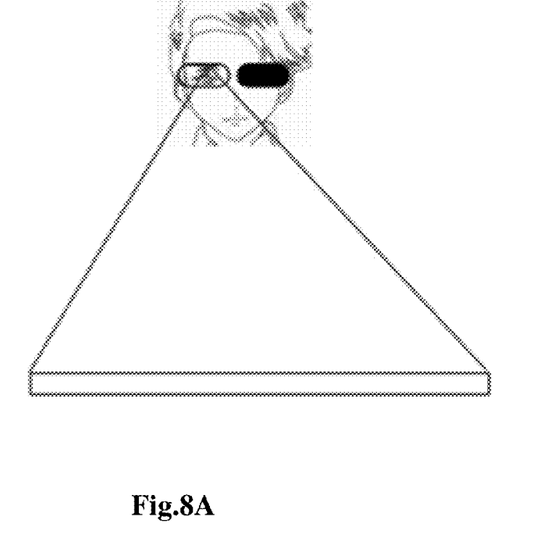
FIGS. 8A~8B show illustrative principle views of an active shutter glasses according to an exemplary embodiment of the present invention.
Figure 8B:
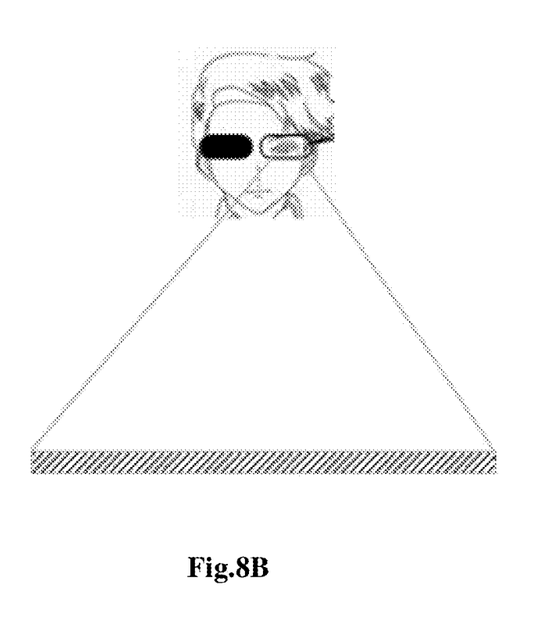

Hereafter, it will describe the operation principle of the active shutter glasses according to the exemplary embodiments of the present invention with reference to FIGS. 8A and 8B.

In the initial state, there is no voltage applied on the strip electrodes of the left and right glasses, and at this time, the electrochromism layer between the strip electrodes of each set of strip electrodes in the left and right glasses is operated in the transparent state, and a light emitted from a display apparatus can transmit through the electrochromism layers of the left and right glasses. In this case, a picture is seen by the viewer in the 2D display mode.

At a current time, if the strip electrodes of each set of strip electrodes in left glass (or right glass) which contact the electrochromism layers are applied with a positive voltage, for example, about 0.1~3V, the strip electrodes of each set of strip electrodes in right glass (or left glass) which contact the electrochromism layers are applied with a negative voltage, for example, about −0.1~−3V, and the strip electrodes of each set of strip electrodes in left and right glasses which do not contact the electrochromism layers are used as the common electrode with a voltage value of 0V, then the electrochromism layers between the strip electrodes in the left glass (or right glass) occur the reduction reaction under the electric field and become the non-transparent state to form the light shielding region, and the electrochromism layers between the strip electrodes in the right glass (or left glass) occur the oxidation reaction under the electric field and keep the transparent state to form the light transmission region. In this case, as shown in FIG. 8A, the light emitted from the display apparatus only can transmit through the right glass (or left glass).

At a subsequent time, if the strip electrodes of each set of strip electrodes in left glass (or right glass) which contact the electrochromism layers are applied with a negative voltage, for example, about −0.1~−3V, the strip electrodes of each set of strip electrodes in right glass (or left glass) which contact the electrochromism layers are applied with a positive voltage, for example, about 0.1~3V, and the strip electrodes of each set of strip electrodes in left and right glasses which do not contact the electrochromism layers are used as the common electrode with a voltage value of 0V, then the electrochromism layers between the strip electrodes in the left glass (or right glass) occur the oxidation reaction under the electric field and become the transparent state to form the light transmission region, and the electrochromism layers between the strip electrodes in the right glass (or left glass) occur the reduction reaction under the electric field and become the non-transparent state to form the light shielding region. In this case, as shown in FIG. 8B, the light emitted from the display apparatus only can transmit through the left glass (or right glass). The 3D display effect can be achieved by repeating the above processes of FIGS. 8A and 8B.

The active shutter glasses of the present invention adopt the shutter light valve method and are often applied in a display apparatus having a frequency of 120 Hz or more. The switching frequency of the glass, which is the switching frequency from the transparent state to the non-transparent for the same one glass, is set to be equal to the frequency of the display apparatus, so that the left and right eyes of the viewer only can see the left eye picture or the right eye picture at different times by switching the light transmission and the light shielding, achieving the 3D display.

In the active barrier according to exemplary embodiments of the present invention, the light transmission region and the light shielding region of the active barrier can be formed by means of the oxidation reaction and the reduction reaction of the electrochromism layer between the strip electrodes of each set of strip electrodes, achieving the bare eye mode of 3D display and the switching mode between 2D display and 3D display. Since the active barrier of the present invention does not need the polarizer and the friction orientation polyimide films, it simplifies the producing process of the active barrier and improves the display brightness. Furthermore, the electrochromism layer has a property of keeping its current state, achieving the bistable function of the active barrier and reducing the energy consumption.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An active barrier, comprising:
a first substrate and a second substrate;
at least one set of strip electrodes disposed between the first and second substrates, each set of strip electrodes comprising two strip electrodes, and two adjacent sets of strip electrodes being separated from each other; and
at least one electrochromism layer and at least one electrolyte layer, wherein one of the at least one electrochromism layer and one of the at least one electrolyte layer are disposed in a region defined by the two strip electrodes of each set of strip electrodes between the first and second substrates,
wherein, for each set of strip electrodes, the electrochromism layer contacts only one of the two strip electrodes, and the electrolyte layer contacts at least one of the two strip electrodes;
wherein an insulation layer is disposed between the two strip electrodes of each set of strip electrodes;
wherein, for each set of strip electrodes, the electrochromism layer contacts one of the two strip electrodes at one side thereof, and contacts one side of the insulation layer at the other side thereof, the other side of the insulation layer contacting the other of the two strip electrodes; and
wherein the electrolyte layer is disposed above the electrochromism layer, and contacts the two strip electrodes, respectively, at both sides thereof.

2. The active barrier according to claim 1, wherein a protection layer is disposed between any two adjacent sets of strip electrodes, and the protection layer is made of insulation material.

3. The active barrier according to claim 1, wherein the insulation layer has a thickness larger than or equal to a thickness of the electrochromism layer, and less than or equal to a thickness of the strip electrode.

4. The active barrier according to claim 1, wherein, for each set of strip electrodes, if a voltage applied on one of the two strip electrodes, which is in contact with the electrochromism layer, is higher than that applied on the other of the two strip electrodes, the electrochromism layer exhibits a non-transparent state under an action of an electric field and forms a light shielding region of the active barrier; and
wherein, for each set of strip electrodes, if a voltage applied on one of the two strip electrodes, which is in contact with the electrochromism layer, is lower than that applied on the other of the two strip electrodes, the electrochromism layer exhibits a transparent state under an action of an electric field and forms a light transmission region of the active barrier.

5. The active barrier according to claim 1, wherein one of the two strip electrodes of each set of strip electrodes, which does not contact the electrochromism layer, is set as a common electrode.

6. A method for producing an active barrier, comprising steps of:
S41: forming at least one set of strip electrodes on a first substrate or a second substrate by a patterning process;
S42: forming an electrochromism layer and an electrolyte layer in a region defined by two strip electrodes of each set of strip electrodes on the first substrate or the second substrate; and
S43: assembling and packing the first substrate and the second substrate,
wherein the step S42 comprises steps of:
forming an insulation layer in the region between the two strip electrodes of each set of strip electrodes by a patterning process, wherein the insulation layer is disposed on the first substrate or the second substrate and contacts one of the two strip electrodes at one side thereof;
forming the electrochromism layer between the two strip electrodes of each set of strip electrodes by a dripping or coating process, wherein the electrochromism layer is disposed in the same layer as the insulation layer, and the electrochromism layer contact the insulation layer at one side thereof and contacts the other of the two strip electrodes at the other side thereof; and forming the electrolyte layer on the electrochromism layer and the insulation layer by a dripping process, wherein the electrolyte layer contacts the two strip electrodes of a respective set of strip electrodes, respectively, at both sides thereof.

7. A method for producing an active barrier, comprising steps of:

S41: forming at least one set of strip electrodes on a first substrate or a second substrate by a patterning process;

S42: forming an electrochromism layer and an electrolyte layer in a region defined by two strip electrodes of each set of strip electrodes on the first substrate or the second substrate; and S43: assembling and packing the first substrate and the second substrate, wherein the step S42 comprises steps of:

forming an insulation layer in the region between the two strip electrodes of each set of strip electrodes by a patterning process, wherein the insulation layer is disposed on the first substrate or the second substrate, and one side of the insulation layer contacts one of the two strip electrodes of a respective set of strip electrodes; and forming the electrochromism layer between the two strip electrodes of each set of strip electrodes by a dripping or coating process, wherein the electrochromism layer is disposed in the same layer as the insulation layer, the electrochromism layer contacts the insulation layer at one side thereof and contacts the other of the two strip electrodes at the other side thereof, and wherein, in the step S43, potting electrolyte material into the active barrier through an inlet, formed between the first and second substrates by assembling, by a vacuum potting process.

8. A display apparatus, comprising:
a display panel; and
the active barrier according to claim 1 disposed in a display region of the display panel.

9. The display apparatus according to claim 8, wherein a projection area of the electrochromism layer, located between the two strip electrodes of each set of strip electrodes of the active barrier, projected on an array substrate of the display apparatus is an area where a column of pixels are located.

10. The display apparatus according to claim 8, wherein if a projection area of the electrochromism layer, located between the two strip electrodes of each set of strip electrodes of the active barrier, projected on an array substrate of the display apparatus is larger than an area where a column of pixels are located, then an area between the two strip electrodes of each set of strip electrodes except the electrochromism layer and that occupied by the two strip electrodes are blocked with a black matrix.

11. An active shutter glasses, comprising:
a first substrate and a second substrate;
at least one set of strip electrodes disposed between the first and second substrates, each set of strip electrodes comprising two strip electrodes, and two adjacent sets of strip electrodes being separated from each other; and
at least one electrochromism layer and at least one electrolyte layer, wherein one of the at least one electrochromism layer and one of the at least one electrolyte layer are disposed in a region defined by the two strip electrodes of each set of strip electrodes between the first and second substrates;
wherein, for each set of strip electrodes, the electrochromism layer contacts only one of the two strip electrodes, and the electrolyte layer contacts at least one of the two strip electrodes,
wherein an insulation layer is disposed between the two strip electrodes of each set of strip electrodes; and
wherein, for each set of strip electrodes, the electrochromism layer contacts one of the two strip electrodes at one side thereof, and contacts one side of the insulation layer at the other side thereof, and the other side of the insulation layer contacts the other of the two strip electrodes; the electrolyte layer is disposed above the electrochromism layer, and contacts the two strip electrodes, respectively, at both sides thereof.

12. The active shutter glasses according to claim 11, wherein a protection layer is disposed between any two adjacent sets of strip electrodes, and the protection layer is made of insulation material.

13. The active shutter glasses according to claim 11, wherein the insulation layer has a thickness larger than or equal to a thickness of the electrochromism layer, and less than or equal to a thickness of the strip electrode.

14. The method according to claim 6, wherein the electrochromism layer is formed in a first sub-region and the electrolyte layer is formed in a second sub-region adjacent to the first sub-region.

\* \* \* \* \*

UNITED STATES PATENT AND TRADEMARK OFFICE
CERTIFICATE OF CORRECTION

| | | |
|---|---|---|
| PATENT NO. | : 9,122,118 B2 | Page 1 of 1 |
| APPLICATION NO. | : 14/102129 | |
| DATED | : September 1, 2015 | |
| INVENTOR(S) | : Wenbo Li and Xin Gu | |

It is certified that error appears in the above-identified patent and that said Letters Patent is hereby corrected as shown below:

In the specification

Col. 3, Line 30
  Delete "bather"
  Insert --barrier--

Col. 8, Line 39
  Delete "bather"
  Insert --barrier--

Col. 8, Line 67
  Delete "bather"
  Insert --barrier--

Col. 9, Line 1
  Delete "bather"
  Insert --barrier--

Signed and Sealed this
Fifth Day of April, 2016

Michelle K. Lee
*Director of the United States Patent and Trademark Office*